Nov. 24, 1970      A. M. WANNINGER      3,543,143

DWELL METER

Filed June 17, 1968

*Inventor:—*
*Albert M. Wanninger,*
*By Hofgren, Wegner, Allen,*
*Stellman & McCord Attys.*

United States Patent Office 3,543,143
Patented Nov. 24, 1970

3,543,143
DWELL METER
Albert M. Wanninger, Prospect Heights, Ill., assignor to Peerless Instrument Co., a corporation of Illinois
Filed June 17, 1968, Ser. No. 737,588
Int. Cl. G01m *15/00*
U.S. Cl. 324—16
8 Claims

ABSTRACT OF THE DISCLOSURE

A dwell meter apparatus for indicating the dwell of an engine such as an automotive engine. The meter apparatus includes an ammeter readout means for indicating the dwell angle. The dwell meter is arranged to be connected across the points of the ignition system of the engine and includes means for shorting the ammeter during the time the points of the engine are open and means for applying a voltage across the ammeter during substantially the entire dwell time of the points. The applied voltage is substantially equal to the voltage of a Zener diode connected in parallel with the ammeter.

BACKGROUND OF THE INVENTION

Field of the invention

This invention relates to electrical meter apparatus and in particular to dwell meter apparatus for indicating the dwell of an engine.

Description of the prior art

In an engine such as an automotive engine, an ignition system is provided for controlling the firing of spark plugs and the like. The conventional ignition system includes a distributor having a shaft carrying a cam for operating, or for making and breaking seriatim, breaker points defining a series switch in the ignition system. The number of degrees the distributor shaft rotates while the points are closed is defined as the dwell. It has been found that permitting the points to remain closed for an excessive time shortens the lift thereof. Alternatively, where the points are closed for too short a period of time, failure of ignition at higher speeds may occur.

To ascertain the dwell provided by a given distributor, a dwell meter may be connetced across the contact points while the engine is run at idling speed, with the current flowing through the meter providing an indication of the dwell time as a function of the integrated flow and no-flow current conditions thusly produced. The dwell meters of the prior art have had several disadvantages. More specifically, in the conventional low cost dwell meter, the meter provides a reverse type indication in that the greater the dwell, the lower the meter reading. To eliminate this undesirable condition, a number of relatively expensive meters have been developed utilizing batteries, and the like, to provide a direct type reading wherein the meter reading increases with the dwell angle.

SUMMARY OF THE INVENTION

The present invention eliminates the disadvantages of the above discussed prior art dwell meters and provides a low cost, direct reading type of dwell meter. The invention comprehends a provision of such a dwell meter apparatus which avoids the use of relatively expensive batteries, and the like, and which utilizes substantially maintenance free electrical components in an extremely simple and economical circuit arrangement.

More specifically, the invention comprehends a dwell meter apparatus having an ammeter means connected in parallel with a Zener diode and conductor means for connecting the parallel circuit of the ammeter means and Zener diodes in parallel with the points, means for causing the ammeter to provide a reading as a direct function of the dwell time including diode means for shorting the ammeter means during the time the contacts are open, and capacitance means for applying a voltage substantially equal to the Zener diode voltage effectively across the meter during the dwell time of the contacts.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
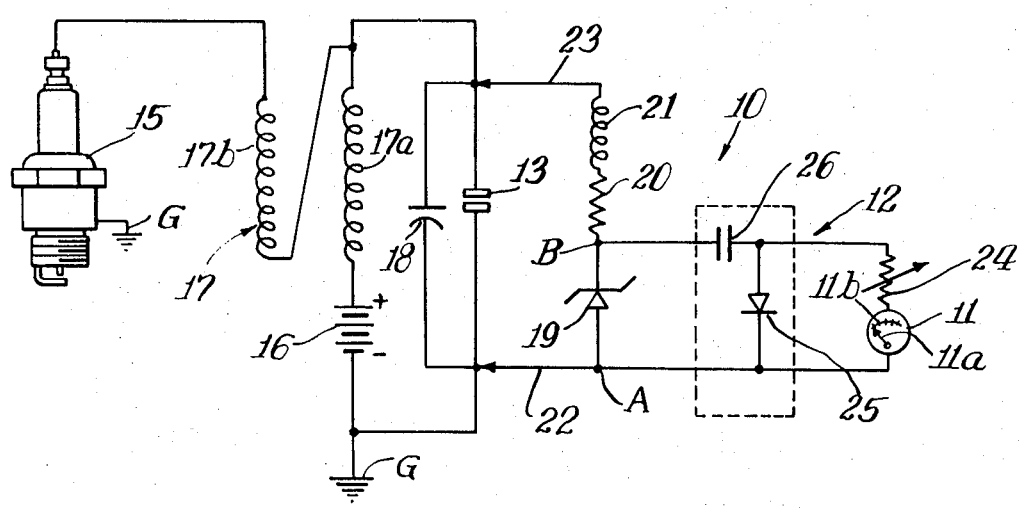
FIG. 1 is a schematic wiring diagram illustrating a dwell meter apparatus embodying the invention in association with a portion of the ignition system of an engine.

In the exemplary embodiment of the invention as disclosed in the drawing, a dwell meter apparatus generally designated 10, is shown to comprise a conventional ammeter 11 connected in a circuit 12 adapted to be removably connected across the points 13 of a conventional ignition system 14 of an engine such as an automobile engine. As indicated briefly above, the dwell meter apparatus 10 is arranged to provide a reading in meter 11 directly related to the dwell angle of the contact points 13, i.e., a reading which is a direct function of the dwell time.

In illustrating the invention, the apparatus 10 is shown in association with the conventional ignition system 14 which includes a spark plug 15. The spark plug 15 is connected between ground G and the high side of a conventional storage battery 16 through a conventional coil 17. The contact points 13 are connected in series with primary winding 17a of the coil 17 to ground G, with the series primary coil 17a and contact 13 circuit being in parallel with the series secondary coil 17b and spark plug 15 circuit. A distributor condenser 18 is connected in parallel with the contact points 13. Contact points 13 are adjustable to provide a range of dwell time, i.e., the time they are closed to effect ignition by spark plug 15. The adjusting means are conventional and form no part of the present invention.

As discussed above, circuit 12 is arranged to cause the meter 11 to provide a reading as a direct function of the dwell angle. To this end, circuit 12 includes a conventional Zener diode 19 connected in series with a resistor 20 and inductance coil 21 for preventing loading of high frequency components by circuit 12. The series circuit of Zener diode 19, register 20 and coil 21 is connected across the contact points 13 by suitable leads 22, 23.

The ammeter 11 is connected in series with an adjustable resistor 24 with the series circuit of the ammeter 11 being connected in parallel with a diode 25. The parallel circuit of the diode 25 and series connected ammeter 11 and resistor 24 is connected in series with a condenser 26, with this series circuit being connected in parallel with the Zener diode 19.

Illustratively, the battery 16 may comprise a conventional 12-volt battery. The inductance coil 21 may comprise a 70 millihenry coil, the resistor 20 may comprise a 330 ohm resistor, the Zener diode 19 may have a breakdown voltage of 9.1 volts, the condenser 26 may comprise a 100 microfarad condenser, the resistor 24 may comprise a 2000 ohm resistor and the meter 11 may comprise a 1.5 milliammeter. The parameters discussed above are illustrative only, it being obvious to those skilled in the art that suitable variations in the parameters may be made as desired.

Figure 2:
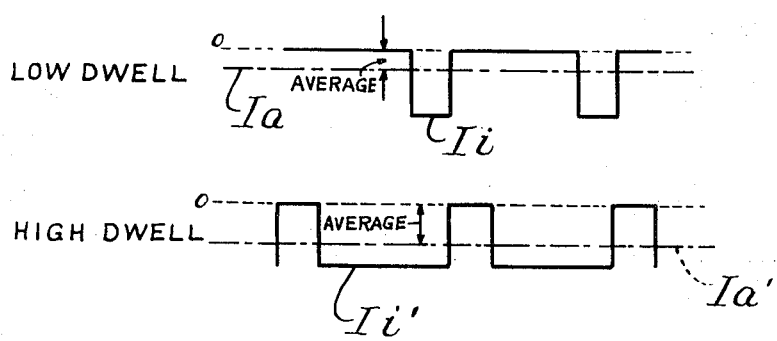
FIG. 2 is a graphic representation of the dwell current effected by the opening and breaking of the ignition contact points and the resultant meter indication.

The functioning of dwell meter apparatus 10 is extremely simple. Illustratively, the leads 22 and 23 may be connected across the points 13 to ground G with the engine running at idling speed. As shown in FIG. 2, where the dwell angle is small, the low dwell is indicated on meter 11 as a result of the relatively small duration of the closed condition of the contact points 13. More specifically, during the open condition of contact points 13 the current flow through the Zener diode 19 provides a voltage of 9.1 volts across points $a$ and $b$ of the circuit 12. This voltage charges up condenser 26 through the short circuiting diode 25 which prevents current flow through the meter 11 at this time. When the contact points 13 close, the condenser 26 discharges through the series circuit of the resistor 20, coil 21, ammeter 11 and resistor 24 to provide a current flow therethrough for a short period of time corresponding to the dwell angle. Thus, as shown in FIG. 2, for a small dwell angle, or low dwell, the average current $Ia$ produced by the long no flow-short high flow instantaneous meter current $Ii$ is relatively small. Where the dwell angle is large, the average current $Ia'$ as produced by the short no flow-long high flow instantaneous current $Ii'$ is correspondingly greater. Resulting, the meter 11 shows an indication of the dwell which increases as a direct function of the dwell angle by the desirable increasing indication of the indicator needle 11$a$ relative to the conventional scale 11$b$ on the ammeter 11.

The improved direct reading dwell meter apparatus 10 eliminates the relatively expensive batteries of the conventional direct reading dwell meters and, thus, provides the highly desirable advantage of simplicity and economy of construction as well as substantial elimination of maintenance as required by the conventional limited-life batteries. The meter 11 may be of conventional economic construction to provide conventional dwell angle indication such as from zero to 45°. Thus, illustratively, where the meter is used with a conventional 8-cylinder automobile engine utilizing a conventional dwell angle of approximately 28° to 32°, the meter will have an indication slightly to the left of center in the desired dwell angle range, and a dwell angle variation above and below the desired angle range will be indicated by corresponding movement of the indicator needle 11$a$ correspondingly to the right or to the left thereof.

I claim:

1. In a meter apparatus for indicating the dwell of the points of an automotive engine ignition circuit, or the like, said apparatus having an ammeter means connected in parallel with a Zener diode and conductor means for connecting the parallel circuit of said ammeter means and Zener diode in parallel with said points, means for causing the ammeter means to provide a reading as a direct function of the dwell time comprising: diode means connected across the ammeter means for shorting the ammeter means during the time said points are open; and capacitance means connected in said meter apparatus to be charged to the Zener diode voltage from the engine ignition circuit during the time the points are open and partially discharged through the ammeter means during the dwell time of the points, the capacitance means and ammeter means being selected such that voltage on said capacitance means is substantially maintained during the time the points are closed thereby to apply a voltage substantially equal to the Zener diode voltage effectively across the ammeter means during substantially the entire dwell time of said points.

2. The meter apparatus of claim 1 wherein said ammeter means includes an ammeter and resistor means in series.

3. The meter apparatus of claim 1 wherein said capacitance means comprises a capacitor in series with said parallel circuit of said diode means and said ammeter means preselected to cause the voltage across the ammeter means to define a square wave.

4. The meter apparatus of claim 3 wherein the series circuit of said capacitor and paralleled diode means and ammeter means is connected in parallel with said Zener diode.

5. The meter apparatus of claim 1 wherein said diode means is connected in series with said capacitance means across said Zener diode, and said diode means is arranged to conduct oppositely to said Zener diode means.

6. The meter apparatus of claim 1 wherein said conductor means includes inductance means.

7. The meter apparatus of claim 1 wherein said conductor means includes resistance means.

8. The meter apparatus of claim 1 wherein said conductor means includes series connected inductance and resistance means, said ammeter means include a series connected ammeter and resistance means, and said capacitance means comprises a capacitor in series with said parallel circuit of said diode means and said ammeter means.

References Cited
UNITED STATES PATENTS

| | | | |
|---|---|---|---|
| 3,219,926 | 11/1965 | Dion | 324—70 |
| 3,275,932 | 9/1966 | Parmater | 324—16 |

OTHER REFERENCES

Simplest Tachometer/Dwellmeter, Duane H. Sweet, Radio-Electronics, August 1966, pp. 44–45.

RUDOLPH V. ROLINEC, Primary Examiner

M. J. LYNCH, Assistant Examiner